United States Patent [19]
Milner

[11] 4,013,303
[45] Mar. 22, 1977

[54] FOLD-AWAY TOW BAR

[76] Inventor: William J. Milner, Pleasantville, Iowa 50225

[22] Filed: Aug. 27, 1975

[21] Appl. No.: 608,072

[52] U.S. Cl. .......................................... 280/491 D
[51] Int. Cl.² .......................................... B60D 1/00
[58] Field of Search ....... 280/491 R, 491 A, 491 B, 280/491 D, 507; 293/69 R; 224/42.03 R, 42.03 A

[56] References Cited

UNITED STATES PATENTS

| | | | |
|---|---|---|---|
| 2,601,993 | 7/1952 | McCall | 280/507 X |
| 2,995,386 | 8/1961 | Peterson | 280/491 D |
| 3,281,162 | 10/1966 | Carson | 280/491 B X |
| 3,704,900 | 12/1972 | Gerber | 280/491 D |
| 3,774,949 | 11/1973 | Eger | 280/491 D X |
| 3,806,162 | 4/1974 | Milner | 280/491 R X |

*Primary Examiner*—Joseph F. Peters
*Assistant Examiner*—R. Schrecengost
*Attorney, Agent, or Firm*—Zarley, McKee, Thomte & Voorhees

[57] ABSTRACT

A fold-away tow bar comprising an elongated housing operatively mounted on the front bumper of the vehicle to be towed. The housing includes a front door or cover which is hingedly mounted thereon to permit access to the interior of the housing. First and second tow bars are each pivotally connected at one end thereof to the housing adjacent the opposite ends thereof. The tow bars are normally stored within the housing in a "folded" condition. The bars may be pivotally moved relative to the housing to a towing position whereby the forward ends of the bars may be secured together by a pin means. One of the bars is provided with a clevis element pivotally mounted thereon for attachment to the towing vehicle.

7 Claims, 9 Drawing Figures

U.S. Patent  Mar. 22, 1977  4,013,303
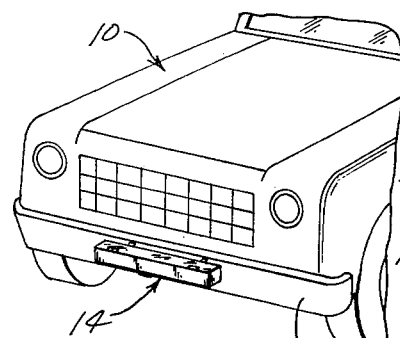
Fig. 1
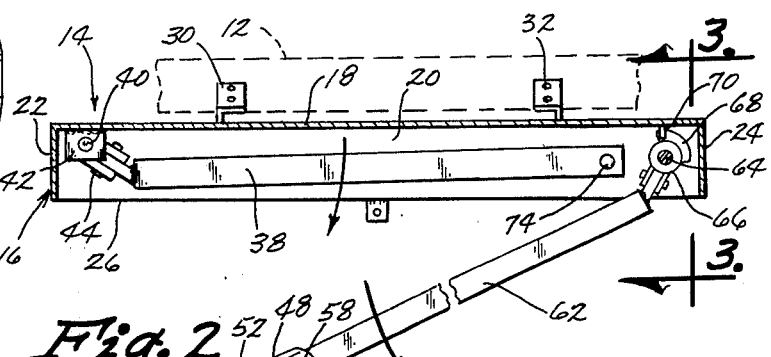
Fig. 2
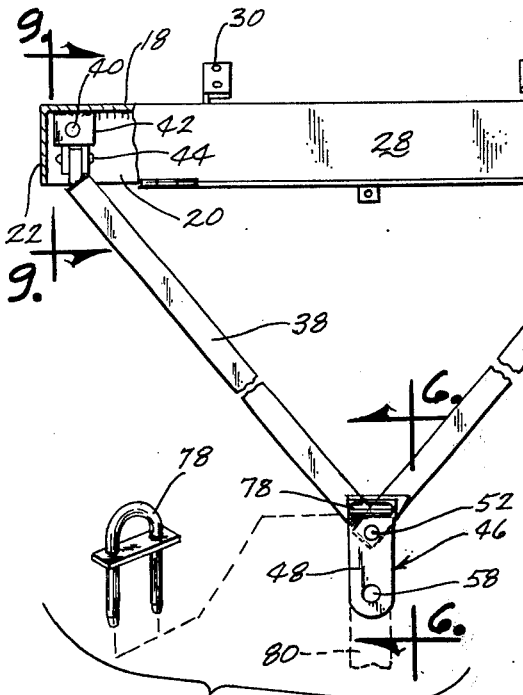
Fig. 4
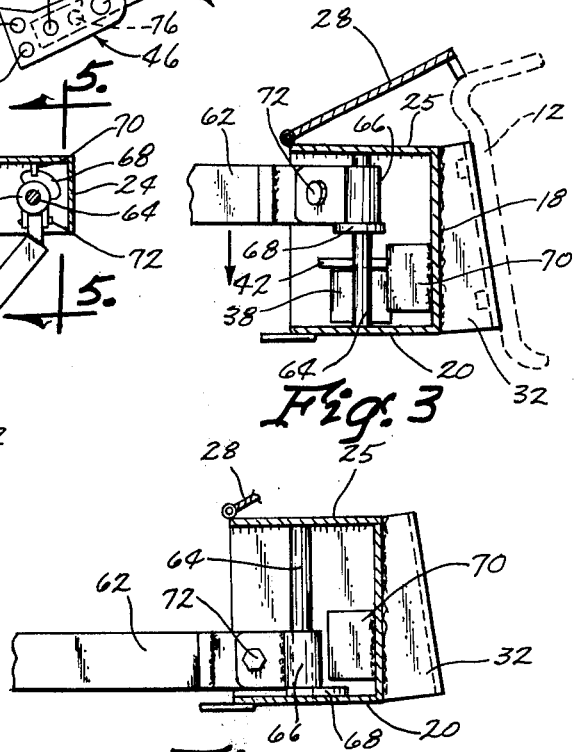
Fig. 3
Fig. 5
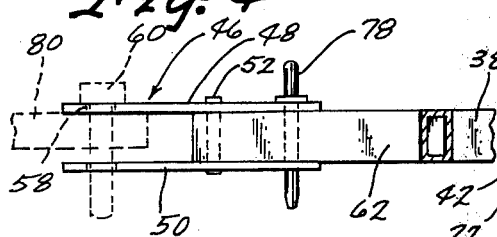
Fig. 6
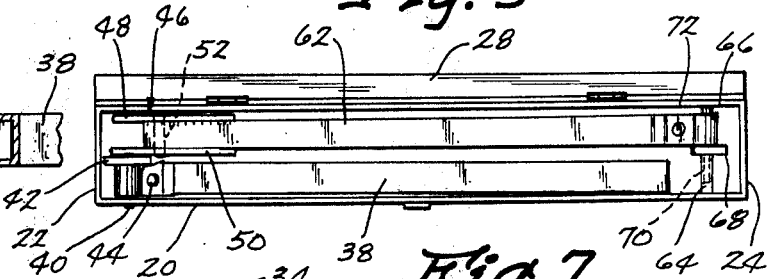
Fig. 7
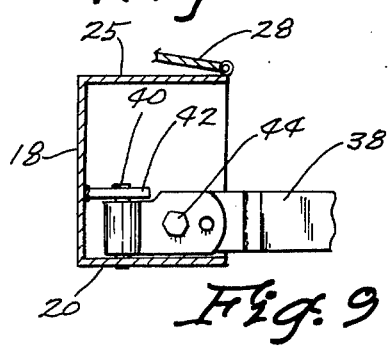
Fig. 9
Fig. 8

FOLD-AWAY TOW BAR

BACKGROUND OF THE INVENTION

Many towing bars have been previously provided to permit one vehicle to be towed behind another vehicle. Conventional towing bars ordinarily are secured to the bumper of the towed vehicle and extend forwardly therefrom for connection to the rear bumper of the towing vehicle. In an effort to provide an improved towing bar, applicant has previously devised a towing bar which is described in the U.S. Pat. No. 3,806,162. The previous towing bar represented an improvement in the prior art devices and the instant invention is believed to represent a significant advance in the art since means is provided for storing the tow bar in a housing which is mounted on the front bumper of the vehicle to be towed.

Therefore, it is the principal object of the invention to provide an improved tow bar.

A further object of the invention is to provide a fold-away tow bar.

A still further object of the invention is to provide a tow bar which may be stored in a folded condition within an enclosed housing secured to the front bumper of the vehicle to be towed.

A still further object of the invention is to provide a tow bar which is easily moved from a stored condition to an operative position.

A further object of the invention is to provide a fold-away tow bar which is safe to use.

A still further object of the invention is to provide a fold-away tow bar which is economical to manufacture, durable in use and refined in appearance.

These and other objects will be apparent to those skilled in the art.

BRIEF DESCRIPTION OF THE DRAWINGS

FIG. 1 is a partial front perspective view of a vehicle having the tow bar of this invention mounted on the front bumper thereof;

FIG. 2 is a top view of the invention with portions thereof cut away to more fully illustrate the invention;

FIG. 3 is an enlarged sectional view seen on lines 3—3 of FIG. 2;

FIG. 4 is a top view similar to FIG. 2 but which illustrates the tow bar arms pivotally moved to the operative or towing position;

FIG. 5 is an enlarged sectional view seen on lines 5—5 of FIG. 4;

FIG. 6 is an enlarged sectional view seen on lines 6—6 of FIG. 4;

FIG. 7 is a front view of the invention illustrating the arms in their folded condition with the housing door being in an open position;

FIG. 8 is a front perspective view of a modified form of the invention; and

FIG. 9 is an enlarged sectional view seen on lines 9—9 of FIG. 4.

DESCRIPTION OF THE PREFERRED EMBODIMENT

In the drawings, the numeral 10 refers generally to a conventional vehicle which is to be towed and which includes a front bumper 12. The tow bar of this invention is referred to generally by the reference numeral 14 and includes a housing 16. Housing 16 is elongated and includes a back wall 18, bottom wall 20, side walls 22, 24, top wall 25 and an open forward end 26 which is normally closed by a hinged cover or front wall 28. A pair of brackets 30 and 32 are secured to back wall 18 for attachment to the bumper 12 as illustrated in FIG. 3. In the modified form of the device of FIG. 8, a pair of brackets 34 and 36 are secured to the top wall 25 as illustrated to permit the housing to be positioned slightly lower relative to the bumper. For example, the device of FIGS. 1–7 would be suitable for use on ½ ton pickups while the device of FIG. 8 could be used on ¾ ton trucks. On the larger trucks, the front bumpers are higher than on smaller trucks and it is desirable to lower the housing so that the tow bar will more closely match the rear bumper of the towing truck.

The rearward end of tow bar 38 is pivotally mounted on pin 40 which extends between ear 42 and bottom wall 20 as illustrated in FIG. 9. Bar 38 is also provided with a horizontally disposed pivot 44 to permit the forward end of the bar 38 to be raised and lowered relative to the housing.

The rearward end of tow bar 62 is pivotally connected to post 64 which is secured to and which extends between top wall 25 and bottom wall 20 as illustrated in FIG. 5. Bar 62 is provided with a collar 66 at its rearward end which rotatably embraces the post 64 and which has a cam 68 extending laterally from the lower end thereof as illustrated in FIG. 2 and 5. The numeral 70 refers to an ear which is secured to back wall 18 and which extends forwardly therefrom towards post 64 as will be described in greater detail hereinafter. Bar 62 is also provided with a horizontally disposed pivotal connection 72 to permit the forward end thereof to be raised and lowered relative to the housing. Clevis 46 comprising clevis elements 48 and 50 is pivotally secured to the forward end of bar 62 by means of pin 52 extending through the elements 48, 50 and bar 62 as illustrated in FIG. 6. Clevis element 48 is provided with a pair of spaced apart openings 54 and 56 provided in the rearward end thereof as illustrated in FIG. 2. Clevis element 50 is also provided with a pair of spaced apart openings formed therein which register with the openings 54 and 56. The forward end of clevis element 48 is provided with an opening 58 as seen in FIG. 4. Likewise, the forward end of clevis element 50 is provided with an opening which registers with opening 58 to permit a clevis pin 60 to be extended therethrough in conventional fashion. The forward end of bar 38 is provided with an opening 74 formed therein.

FIG. 7 illustrates the bars 38 and 62 in their folded or stored condition within housing 16. In FIG. 7, cover 28 has been opened. FIG. 1 illustrates the housing 16 in a closed position and the closed condition of the housing would prevent dirt, mud or debris from entering the interior of the housing during the periods that the device is not being used.

When it is desired to utilize the tow bar, cover 28 is pivotally moved upwardly to the open position as illustrated in FIG. 3. Bar 62 is then pivotally moved in a counterclockwise direction as viewed in FIG. 2. As bar 62 is moved in the counterclockwise direction, the rearward end of the bar 62 will clear bar 38 which permits the rearward end of the bar 62 to slide downwardly on the post 64. Continued counterclockwise movement of the bar 62 causes cam 68 to move beneath the lower end of ear 70. Thus, when bar 62 is in the position of FIG. 4, ear 70 limits the upward movement of the rearward end of bar 62 since cam 68 is positioned below ear 70.

Bar 38 is then pivotally moved in a clockwise direction as illustrated by the arrow in FIG. 2 until the position of FIG. 4 is achieved. Clevis 46 is then rotated relative to the bar 62 so that the openings 54 amd 56 formed therein register with opening 76 in the bar 62 and with opening 74 in the bar 38. The U-shaped pin 78 is then extended downwardly through the clevis and through the forward ends of the bars 38 and 62 to maintain the bars in the operative position of FIG. 4. The tow bar may then be secured to the hitch 80 of the towing vehicle by means of the pin 60.

When it is desired to place the bar in its stored condition, the pin 60 is first removed with the pin 78 then being removed. Bar 38 is moved from the position of FIG. 4 to the position of FIG. 2. Clevis 46 is then pivoted to the position of FIG. 2. Arm 62 is then folded inwardly until the cam 68 is no longer positioned below car 70 at which time the collar 60 is slidably moved upwardly on the post 64 to permit the arm 62 to be positioned on top of arm 38 as viewed in FIG. 7. Clevis 46 rests on pin 40 as illustrated in FIG. 7. The door 28 is then closed and locked if desired.

Thus it can be seen that a novel fold-away tow bar has been provided which is stored within a closed housing during periods of non-use and which may be easily moved to an operative position as desired. The ability of the bar 62 to be positioned above the bar 38 results in less depth being required for the housing. It should also be noted that the means for limiting the upward movement of the rearward end of bar 62 is important since such movement would be undesirable and unsafe.

Thus it can be seen that the device accomplishes at least all of its stated objectives.

I claim:

1. A towing bar for permitting a towing vehicle to tow a towed vehicle, comprising,
   an elongated, horizontally disposed housing operatively secured to the forward end of the towed vehicle and having opposite ends and an interior compartment,
   first and second tow bar members pivotally secured at one end thereof to said housing adjacent the opposite ends thereof,
   said tow bar members having a length less than said housing to permit said tow bar members to be stored within said housing at times,
   said tow bar members being pivotally movable from said stored position to an inwardly and forwardly extending operative position,
   first means for securing the other ends of said tow bar members together in said operative position,
   and means on the said other end of at least one of said tow bar members for connection to the towing vehicle,
   one of said tow bars being vertically movable with respect to its pivotal connection to said housing to permit said one tow bar member to be stored on top of said other tow bar member in said housing.

2. The towing bar of claim 1 wherein means is provided on said housing to prevent vertical movement of said one tow bar member when in its operative position.

3. A towing bar for permitting a towing vehicle to tow a towed vehicle, comprising,
   an elongated, horizontally disposed housing operatively secured to the forward end of the towed vehicle and having opposite ends and an interior compartment,
   first and second tow bar members pivotally secured at one end thereof to said housing adjacent the opposite ends thereof,
   said tow bar members having a length less than said housing to permit said tow bar members to be stored within said housing at times,
   said tow bar members being pivotally movable from said stored position to an inwardly and forwardly extending operative position,
   first means for securing the other ends of said tow bar members together in said operative position,
   and means on the said other end of at least one of said tow bar members for connection to the towing vehicle,
   a vertically disposed post being secured to said housing at one end thereof, said first tow bar member being vertically movable on and pivotally secured to said post to permit said first tow bar member to be stored on top of said second tow bar member.

4. The towing bar of claim 3 wherein an ear is secured to said housing adjacent said post, said ear having a lower end spaced above the lower end of said housing, a cam secured to said one end of said first tow bar member and extendng laterally therefrom, said cam being positioned below the lower end of said ear when said first tow bar member is in its operative position to prevent vertical movement of said one end of said first tow bar member.

5. A towing bar for permitting a towing vehicle to tow a towed vehicle, comprising,
   an elongated, horizontally disposed housing operatively secured to the forward end of the towed vehicle and having a closable front wall, opposite ends and an interior compartment,
   first and second tow bar members pivotally secured at one end thereof to said housing adjacent the opposite ends thereof,
   said tow bar members having a length less than said housing to permit said tow bar members to be stored within said housing at times,
   said tow bar members being pivotally movable from said stored position to an inwardly and forwardly extending operative position,
   first means for securing the other ends of said tow bar members together in said operative position,
   and means on the said other end of at least one of said tow bar members for connection to the towing vehicle,
   said housing being detachably secured to the front bumper of said towed vehicle and having a length substantially less than said front bumper, said closable front wall extending substantially the length of said housing and dwelling in a single plane.

6. The towing bar of claim 5 wherein said first means comprises an inverted U-shaped pin means.

7. The towing bar of claim 5 wherein said means on the said other end of at least one of said tow bar members comprises a clevis element pivotally secured thereto.

* * * * *